United States Patent Office 3,592,840
Patented July 13, 1971

---

3,592,840
PRODUCTION OF VINYL ACETATE
Peter John Durston, Thames Ditton, England, assignor to BP Chemicals (U.K.) Limited, formerly known as Distillers Chemicals and Plastics Limited, London, England
No Drawing. Filed May 17, 1967, Ser. No. 639,067
Claims priority, application Great Britain, June 7, 1966, 25,318/66
Int. Cl. C07c 67/04
U.S. Cl. 260—497A
4 Claims

ABSTRACT OF THE DISCLOSURE

A process for the production of vinyl acetates by the vapour phase catalytic reaction of ethylene, oxygen and acetic acid employing a platinum group metal catalyst supported on titania or mixtures of titania and an alkali metal silicate.

---

The present invention relates to the production of esters of unsaturated alcohols such as vinyl acetate.

Processes for the production of esters of unsaturated alcohols such as vinyl acetate by the oxidation of olefines such as ethylene with molecular oxygen in a mixture containing acetate ion and acetic acid in the presence of a catalyst comprising a platinum group metal are known. Such reactions may be carried out in the liquid or vapour phase.

According to the present invention, a process for the production of vinyl acetate comprises reacting in the vapour phase at an elevated temperature ethylene, a molecular oxygen-containing gas and acetic acid in the presence of a catalyst comprising a platinum group metal deposited on titania, an alkali metal, alkaline earth metal, zinc, cobalt, nickel or iron silicate, or mixtures thereof or mixtures of titania and/or the metal silicates with silica as support.

By the term "platinum group metal" is meant any of the metals platinum, palladium, rhodium, ruthenium, osmium or iridium.

The platinum group metal catalyst may be for instance elemental metal e.g. palladium or rhodiu or the oxides or salts of such metals e.g. palladous chloride. When the catalyst is elemental metal it is preferred to prepare it by reduction of a salt of the metal with hydrazine hydrate in alkaline solution e.g. sodium in potassium hydroxide.

The acetic acid may be supplied to the reaction in vapour form by passage of the gaseous ethylene through a reservoir of the liquid acid so as to saturate the olefine with the acid vapour, or the acid is pumped to the reactor via a vaporiser.

The molecular oxygen containing gas may be oxygen as such, air or mixtures of oxygen with air.

The process may be carried out at atmospheric, sub-atmospheric or super-atmospheric pressure, preferably the process is effected under pressures in the range 1 to 50 atmospheres especially in the range 2 to 20 atmospheres. Suitable reaction temperatures are 50 to 250° C., temperatures in the range 100 to 200° C. being preferred.

The use of titania or titania-silica or titania-silicate mixtures as catalyst supports has the advantage that the catalyst may be readily reactivated. Thus, it has been found that after a time, the rate of production of esters such as vinyl acetate over a given catalyst falls, and it is then found that appreciable amounts of higher boilers have become adsorbed on the catalyst. These can be removed and the vinyl acetate production rate restored completely to the initial value by a second embodiment of the present invention namely heating the catalyst with an alkaline medium such as caustic soda or sodium carbonate solution. Other methods of reactivation include heating in air, steam or inert gas with or without acetic acid or under vacuum.

In operation the process may be carried out for instance by passing the gaseous olefine together with acetic acid vapour and oxygen over the platinum group metal catalyst contained in a heated reaction tube. The acetate ester product which may contain by-products may be recovered from the reaction gases by condensation or solvent extraction and fractional distillation of the condensate or extract. Excess olefine may be re-cycled to the reactor.

The process of the invention is further illustrated by the following examples:

EXAMPLE 1

A 10% palladium/titania catalyst was prepared by adding PdCl$_2$ in 50% hydrochloric acid solution to titania, the catalyst was dried at 140° C. and reduced with alkaline hydrazine. When ethylene (0.3 mole/hr.), oxygen (0.06 mole/hr.), and acetic acid (0.08 mole/hr.) were passed over this catalyst in a thermostatically controlled reactor at 140° C. a rate of vinyl acetate production of 0.10 mole/l./hr. was observed for 70 hours. This rate fell to 0.03 mole/l./hr. after 94 hours. The feeds were temporarily discontinued whilst the catalyst was treated with boiling 2 N sodium hydroxide solution. This treatment increased the rate to 0.30 mole/l./hr. for the next 176 hours but it fell again to 0.01 mole/l./hr.; further treatment with boiling caustic soda restored the rate of 0.30 mole/l./hr. of vinyl acetate maintained for a further 362 hours.

EXAMPLE 2

A 5% palladium on cobalt silicate catalyst was prepared by mixing cobalt nitrate [Co(NO$_3$)$_2$] (27.3 g.) in water (20 ml.) with sodium metal silicate (21.2 g.) and stirring well. After drying at 140° C. for 12 hours, palladium chloride 1.65 g.) in 50% hydrochloric acid was added, and after further drying at 140° C. the catalyst was reduced with alkaline hydrazine.

The reaction was carried out at 150° C. with flow rates of ethylene (0.36 mole/hr.) oxygen (0.06 mole/hr.) and acetic acid (0.13 mole/hr.). A rate of vinyl acetate production of 0.08 mole/l./hr. was obtained for 77 hours and treatment of the catalyst with boiling caustic soda increased the rate to 0.26 mole/l./hr. for a further 50 hours.

EXAMPLE 3

A 5% palladium on a mixed titania/sodium meta silicate catalyst was prepared by mixing equal amounts of titania and sodium meta silicate and adding enough water to make a slurry. This was well mixed and dried at 140° C. The palladium was then added as already described.

The catalyst gave 0.07 mole/l./hr. of vinyl acetate after 2 hours but the rate steadily increased to give 0.30 mole/l./hr. after 20 hours. Thereafter it increased to 0.67 mole/l./hr. which was maintained for a further 168 hours.

As a comparison a 5% palladium on aluminium silicate catalyst (that is a catalyst not in accordance with the present invention) was prepared by the addition of palladium chloride in 50% hydrochloric acid solution to aluminium silicate. The resulting slurry was well mixed and dried at 140° C. the palladium chloride then being reduced with alkaline hydrazine as previously described.

The catalyst gave 0.07 mole/l./hr. of vinyl acetate after 2 hours but the rate fell to 0.037 mole/l./hr. after 23 hours.

EXAMPLE 4

A catalyst containing 3.5% Pd on 1:1 SiO$_2$/TiO$_2$ was prepared by adding titanic chloride, with constant stirring to a solution of sodium metasilicate at 80° C. and which had been brought to pH 7 by the addition of hydrochloric acid. The weights of titanic chloride and of sodium metasilicate were such as to give a 1:1 ratio w./w. of $SiO_2$ to $TiO_2$. The resultant precipitate was stirred for 15 minutes at 80° C. and then filtered, washed with distilled water until free of acid and dried at 140° C. The dry solid was made into a slurry with distilled water, heated to 80° C. and mixed with a solution of palladium chloride ($PdCl_2$) in 50% HCl. After cooling to room temperature, the solid was filtered from the excess palladium chloride solution, reduced with alkaline hydrazine and dried at 140° C.

When ethylene (0.3 mole/hr.), oxygen (0.06 mole/hr.) and acetic acid (0.08 mole/hr.) were passed over this catalyst at 140° C. a rate of vinyl acetate production of 0.56 mole/litre/hour was obtained for 1029 hours, without regeneration or any reduction in the catalyst's activity.

EXAMPLE 5

A 7.7% palladium on a mixed (1:1) titania/silica catalyst was prepared by dissolving sodium metasilicate in water and precipitating the silica by the addition of concentrated hydrochloric acid until the pH was 7. Titanium tetrachloride was added to the solution and titania precipitate. The mixture was stirred well, filtered, and dried. Palladium chloride was then impregnated on the support and reduced with alkaline hydrazine.

The catalyst gave 1.42 mole/l./hr. of vinyl acetate after 18 hours at 140° C., and the yield was 1.00 mole/l./hr. after 67 hours.

I claim:

1. A process for the production of vinyl acetate which comprises reacting in the vapor phase at an elevated temperature above 50° C. ethylene, a molecular oxygen-containing gas and acetic acid in the presence of a catalyst comprising an elemental platinum group metal selected from the group consisting of platinum, palladium, rhodium, ruthenium, osmium or iridium, deposited on a support material selected from the group consisting of titania, or mixtures of titania and an alkali metal silicate.

2. A process as claimed in claim 1 wherein the catalyst comprises an elemental platinum group and the pressure and temperature in the reactor are elevated.

3. A process as claimed in claim 1 carried out under pressures of 1 to 50 atmospheres absolute.

4. A process as claimed in claim 1 carried out at an elevated temperature of 50 to 250° C.

References Cited

UNITED STATES PATENTS

| | | | |
|---|---|---|---|
| 3,346,623 | 10/1967 | Young | 260—497 |
| 3,403,108 | 9/1968 | Leftin et al. | 260—497 |

FOREIGN PATENTS

| | | | |
|---|---|---|---|
| 1,017,938 | 1/1966 | Great Britain | 260—497 |

LEWIS GOTTS, Primary Examiner

V. GARNER, Assistant Examiner

U.S. Cl. X.R.

252—412, 413, 416, 441, 455R, 457, 460, 472